US012600348B2

(12) United States Patent
Kiyokawa

(10) Patent No.: US 12,600,348 B2
(45) Date of Patent: Apr. 14, 2026

(54) PARKING ASSISTANCE DEVICE

(71) Applicant: AISIN CORPORATION, Aichi (JP)

(72) Inventor: Yusuke Kiyokawa, Tokyo (JP)

(73) Assignee: AISIN CORPORATION, Kariya (JP)

( * ) Notice: Subject to any disclaimer, the term of this patent is extended or adjusted under 35 U.S.C. 154(b) by 107 days.

(21) Appl. No.: 18/691,173

(22) PCT Filed: Sep. 26, 2022

(86) PCT No.: PCT/JP2022/035621
§ 371 (c)(1),
(2) Date: Mar. 12, 2024

(87) PCT Pub. No.: WO2023/054238
PCT Pub. Date: Apr. 6, 2023

(65) Prior Publication Data
US 2024/0383469 A1 Nov. 21, 2024

(30) Foreign Application Priority Data
Sep. 29, 2021 (JP) ................................. 2021-159565

(51) Int. Cl.
*B60W 30/06* (2006.01)
*B60W 40/02* (2006.01)

(52) U.S. Cl.
CPC ............ *B60W 30/06* (2013.01); *B60W 40/02* (2013.01)

(58) Field of Classification Search
CPC ...... B60W 30/06; B60W 40/02; B60W 60/00; B62D 15/0285; G01C 21/26; G08G 1/16
See application file for complete search history.

(56) References Cited

U.S. PATENT DOCUMENTS 10,106,153 B1 * 10/2018 Xiao ...................... B62D 15/02
2004/0257244 A1 12/2004 Kubota et al.
(Continued)

FOREIGN PATENT DOCUMENTS

JP 2008-296639 A 12/2008
JP 2012-025378 A 2/2012
(Continued)

OTHER PUBLICATIONS

International Search Report for PCT/JP2022/035621 dated Nov. 29, 2022.
(Continued)

*Primary Examiner* — Daryl C Pope
(74) *Attorney, Agent, or Firm* — Sughrue Mion, PLLC

(57) ABSTRACT

A parking assistance device is provided and includes an image acquisition unit that acquires a captured image from an imaging unit imaging surrounding circumstances of a vehicle. A setting unit sets at a start of parking assistance, a reference movement target position of the vehicle in a parking space defined by a pair of spaced dividing lines included in the captured image, and sets, after the start of the parking assistance, a movement target position of the vehicle in the parking space included in the captured image. Further, at predetermined control periods, a correction unit corrects the movement target position, based on the reference movement target position, a position acquisition unit that acquires the current position of the vehicle, and a guidance control unit that controls the vehicle to the corrected movement target position, based on the corrected movement target position and the current position.

7 Claims, 10 Drawing Sheets

(56)            References Cited

U.S. PATENT DOCUMENTS

| | | |
|---|---|---|
| 2009/0123028 A1 | 5/2009 | Satonaka |
| 2015/0097956 A1 | 4/2015 | Torii et al. |
| 2021/0001837 A1 | 1/2021 | Hirakawa et al. |
| 2021/0160432 A1 | 5/2021 | Yamamoto et al. |

FOREIGN PATENT DOCUMENTS

| | | |
|---|---|---|
| JP | 2015-074254 A | 4/2015 |
| JP | 2016-060234 A | 4/2016 |
| JP | 2019-156308 A | 9/2019 |
| JP | 2019-186622 A | 10/2019 |
| JP | 2021-088199 A | 6/2021 |

OTHER PUBLICATIONS

Extended European Search Report dated Nov. 6, 2024 in Application No. 22876105.2.

\* cited by examiner

*FIG. 8*

PARKING ASSISTANCE DEVICE

CROSS REFERENCE TO RELATED APPLICATIONS

This application is a National Stage of International Application No. PCT/JP2022/035621 filed Sep. 26, 2022, claiming priority based on Japanese Patent Application No. 2021-159565 filed Sep. 29, 2021, the entire contents of which are incorporated in their entirety.

An embodiment of the present disclosure relates to a parking assistance device.

TECHNICAL FIELD

Background Art

A parking assistance device that assists a vehicle parking operation by a driver in a parking lot or the like is conventionally known. For example, in a parking lot or the like, the parking assistance device sets a movement target position of the vehicle in a parking space defined by dividing lines (e.g. a pair of white lines) included in a captured image, and guides the vehicle to the movement target position.

CITATIONS LIST

Patent Literature

Patent Literature 1: JP 2015-74254 A

SUMMARY OF DISCLOSURE

Technical Problems

When dividing lines are recognized using a captured image, it is assumed that the position and angle of a camera are known. However, in practice, the position and angle of a camera change depending on the weight of passengers and goods, the tire pressure, etc., so that errors occur in the results of recognition of dividing lines using a captured image. The errors vary depending on the distance and direction from the vehicle to the dividing lines.

Errors in the results of recognition of dividing lines cause, for example, cutting of the wheel when the vehicle is guided to the movement target position, reducing the accuracy of vehicle guidance, which is not preferable. For example, adding a vehicle height sensor or the like can provide an improvement but has a problem of increased cost.

The present disclosure provides a parking assistance device that allows a vehicle to be guided to a parking space with high accuracy even when there are errors in the results of recognition of dividing lines using a captured image, without adding a physical configuration.

Solutions to Problems

A parking assistance device of an embodiment of the present disclosure includes, for example, an image acquisition unit that acquires a captured image from an imaging unit that images surrounding circumstances of a vehicle, a setting unit that sets, at the start of parking assistance, a reference movement target position of the vehicle in a parking space defined by a pair of spaced dividing lines included in the captured image, and sets, after the start of the parking assistance, a movement target position of the vehicle in the parking space defined by the pair of dividing lines included in the captured image, at predetermined control periods, a correction unit that corrects the movement target position, based on the reference movement target position, a position acquisition unit that acquires the current position of the vehicle, and a guidance control unit that performs control to guide the vehicle to the corrected movement target position, based on the corrected movement target position and the current position.

This configuration corrects the movement target position after the start of the parking assistance, using the reference movement target position set at the start of the parking assistance, and thus can guide the vehicle into the parking space with high accuracy even when there are errors in the results of recognition of the dividing lines using the captured image, without adding a physical configuration.

In the above-described parking assistance device, for example, the shorter the distance from the vehicle to the movement target position, the smaller the correction unit may make the amount of correction by which to correct the movement target position.

This configuration can avoid a situation in which the movement target position is corrected too much by a factor other than changes in the position and angle of a camera (such as a slope or a step on a road).

In the above-described parking assistance device, for example, when the vehicle moves in a turning path in a direction to approach the movement target position during the parking assistance, the correction unit may perform correction to bring the movement target position closer to the reference movement target position when the movement target position is farther from the turning center of the turning path than the reference movement target position, and may not correct the movement target position when the movement target position is closer to the turning center of the turning path than the reference movement target position.

According to this configuration, when the movement target position is closer to the turning center of the turning path than the reference movement target position, in which the need for correction is low, the movement target position is not corrected. This can avoid destabilization of vehicle guidance that may occur when the movement target position is corrected.

In the above-described parking assistance device, for example, when the amount of correction by which to correct the movement target position increases over time as a result of calculation, the correction unit may maintain the amount of correction without increasing the amount of correction.

This configuration can avoid a situation in which the vehicle swings in the side-to-side directions during guidance.

In the above-described parking assistance device, for example, when the correction unit has recognized a new dividing line in the captured image, the correction unit may reset the amount of correction by which to correct the movement target position.

This configuration can achieve an appropriate response of resetting the amount of correction when a new dividing line has been recognized.

In the above-described parking assistance device, for example, when the angle formed by a direction in which the vehicle moves and a direction in which the pair of dividing lines extend becomes equal to or less than a predetermined angle, the correction unit may finish the correction of the movement target position.

This configuration can achieve an appropriate response of finishing the correction in response to the fact that the angle becomes equal to or less than the predetermined angle, that is, the fact that the possibility of occurrence of cutting of the wheel during vehicle guidance has disappeared.

In the above-described parking assistance device, for example, the setting unit may recognize the start of the parking assistance, based on at least one of the fact that a shift operation part has been in a predetermined position, and the fact that a parking assistance start operation has been performed by a user.

This configuration allows the start of parking assistance to be recognized by a specific trigger such as the fact that the shift operation part has been in the predetermined position or the fact that the parking assistance start operation has been performed by the user.

In the above-described parking assistance device, for example, when correcting the movement target position, based on the reference movement target position, the correction unit may correct the movement target position to the reference movement target position itself, or correct the movement target position to bring the movement target position closer to the reference movement target position.

This configuration allows more specific correction such as correcting the movement target position to the reference movement target position itself or bringing the movement target position closer to the reference movement target position.

BRIEF DESCRIPTION OF DRAWINGS

FIG. 8 is a graph showing the relationship between distance and gain used in the parking assistance device of the embodiment.

DESCRIPTION OF EMBODIMENTS

Hereinafter, an exemplary embodiment of the present disclosure is described. A configuration of the embodiment described below and functions, results, and effects brought by the configuration are examples. Aspects of the present disclosure invention can be implemented by a configuration other than that disclosed in the following embodiment, and can obtain at least one of various effects based on a basic configuration and derivative effects.

Figure 1:
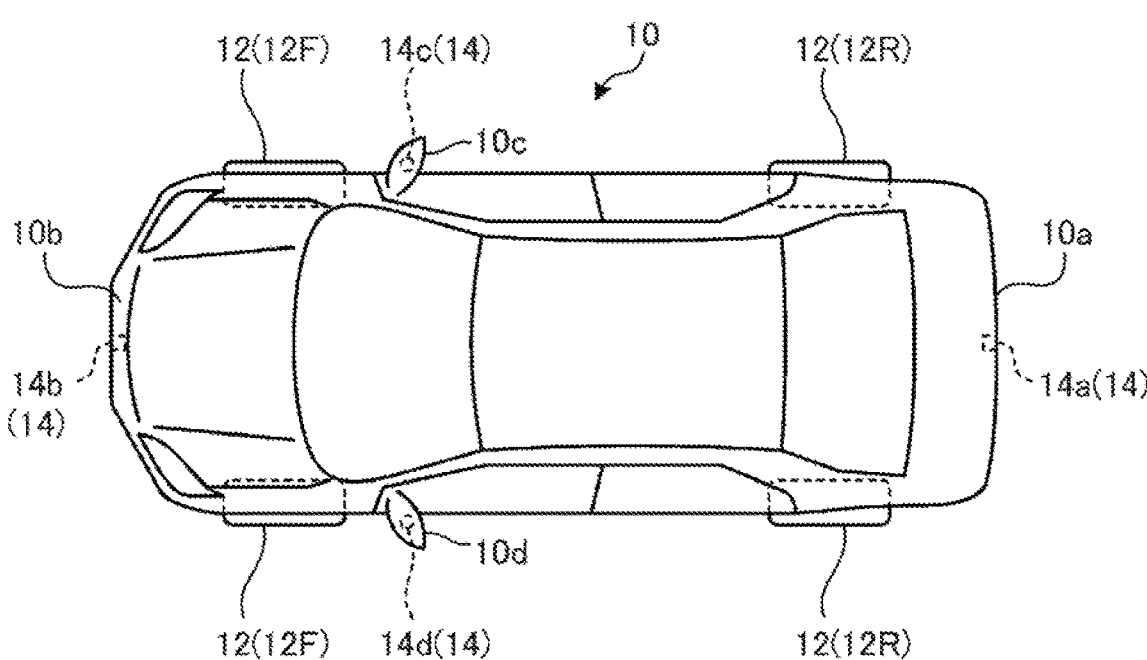
FIG. 1 is a schematic plan view showing an example of a vehicle that can be equipped with a parking assistance device of an embodiment.

FIG. 1 is a schematic plan view illustrating an example of a vehicle 10 that can be equipped with a parking assistance device of the embodiment. The vehicle 10 may be, for example, an automobile with an internal combustion engine (engine, not shown) as a drive source (an internal combustion vehicle), an automobile with an electric motor (motor, not shown) as a drive source (an electric vehicle, a fuel cell vehicle, or the like), or an automobile with both of them as drive sources (a hybrid vehicle). The vehicle 10 can be equipped with various transmissions, and can be equipped with various devices (systems, parts, etc.) necessary for driving the internal combustion engine or the electric motor. The type, number, layout, etc. of devices related to the drive of wheels 12 (front wheels 12F and rear wheels 12R) in the vehicle 10 can be set variously.

As illustrated in FIG. 1, the vehicle 10 is provided, for example, with four imaging units 14a to 14d as a plurality of imaging units 14 (hereinafter, also referred to as "cameras"). The imaging units 14 are, for example, digital cameras each incorporating an imaging element such as a charge-coupled device (CCD) or a CMOS image sensor (CIS). The imaging units 14 can output moving image data (captured image data) at a predetermined frame rate. Each of the imaging units 14 includes a wide-angle lens or a fisheye lens, and can image a range of, for example, 140° to 220° in the horizontal direction. The optical axes of the imaging units 14 may be set obliquely downward. Consequently, the imaging units 14 successively capture images of the surrounding environment outside the vehicle 10, including the road surface on which the vehicle 10 can move, marks provided to the road surface (including dividing lines indicating parking spaces, lane separation lines, arrows, etc.), and objects (such as pedestrians and vehicles as obstacles), and output the images as captured image data.

The imaging units 14 are provided on outer peripheral portions of the vehicle 10. The imaging unit 14a is provided, for example, at a substantially central end portion in the vehicle width direction on the rear side of the vehicle 10, that is, on the back side in the vehicle front-back direction, for example, at a position above a rear bumper 10a, and can image a rear area including a rear end portion of the vehicle 10 (e.g. the rear bumper 10a). The imaging unit 14b is provided, for example, at a substantially central end portion in the vehicle width direction on the front side of the vehicle 10, that is, on the front side in the vehicle front-back direction, for example, at a front bumper 10b, a front grille, or the like, and can capture front images including a front end portion of the vehicle 10 (e.g. the front bumper 10b).

The imaging unit 14c is provided, for example, at a right end portion of the vehicle 10, for example, at a right door mirror 10c, and can capture right side images including an area centered on the right side of the vehicle 10 (e.g. an area from the right front to the right rear). The imaging unit 14d is provided, for example, at a left end portion of the vehicle 10, for example, at a left door mirror 10d, and can capture left side images including an area centered on the left side of the vehicle 10 (e.g. an area from the left front to the left rear).

The parking assistance device of the present embodiment can recognize (detect) dividing lines or the like by performing arithmetic processing and image processing, based on captured image data (images) obtained by the plurality of imaging units 14. By the recognition of dividing lines, the parking assistance device can perform a search for a parking space for parking the vehicle 10, the setting of a movement target position to use when guiding the vehicle 10 into the parking space, the estimation of the current position of the vehicle 10, the calculation of a movement path for guiding the vehicle 10 to the movement target position, etc. By performing arithmetic processing and image processing based on captured image data obtained by the plurality of imaging units 14, the parking assistance device can generate images with a wider viewing angle, and generate virtual images in which the vehicle 10 is viewed from above, the front, the side, etc. (overhead images (plane images), side view images, front view images, etc.).

Figure 2:
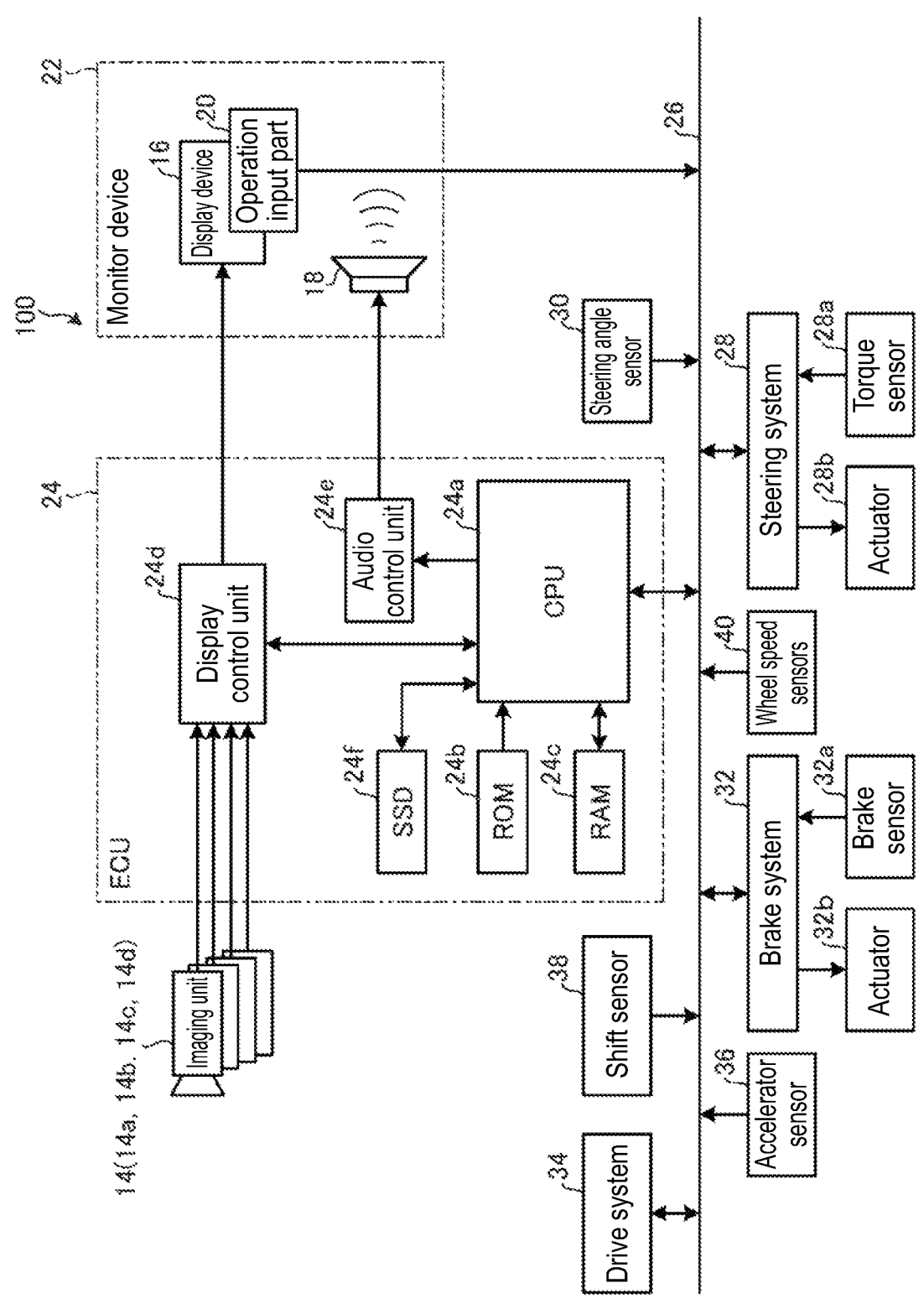
FIG. 2 is an exemplary block diagram of a configuration of a parking assistance system including the parking assistance device of the embodiment.

FIG. 2 is an exemplary block diagram of a configuration of a parking assistance system 100 including the parking assistance device of the embodiment. In the vehicle interior of the vehicle 10, a display device 16 and an audio output device 18 are provided. The display device 16 is, for example, a liquid-crystal display (LCD), an organic electroluminescent display (OELD), or the like. The audio output device 18 is, for example, a speaker. The display device 16 is covered, for example, with a transparent operation input part 20 such as a touch panel. An occupant (e.g., a driver) can visually recognize an image displayed on a display screen of the display device 16 via the operation input part 20. The occupant can perform operation input by operating, for example, touching, pushing, or moving the operation input part 20 with a finger or the like at a position corresponding to an image displayed on the display screen of the display device 16.

The display device 16, the audio output device 18, the operation input part 20, and others are provided, for example, in a monitor device 22 located at a central portion of the dashboard of the vehicle 10 in the vehicle width direction, that is, the side-to-side direction. The monitor device 22 can include an operation input part (not shown) such as a switch, a dial, a joystick, or a push button. The monitor device 22 can be shared, for example, with a navigation system and an audio system.

As illustrated in FIG. 2, the parking assistance system 100 (the parking assistance device) includes an electronic control unit (ECU) 24 in addition to the imaging units 14 (14a to 14d) and the monitor device 22. In the parking assistance system 100, the ECU 24 and the monitor device 22 are electrically connected via an in-vehicle network 26 as an electric communication line. The in-vehicle network 26 is configured, for example, as a controller area network (CAN).

The ECU 24 can control various systems by sending control signals through the in-vehicle network 26. For example, in the parking assistance system 100, in addition to the ECU 24, the monitor device 22, etc., a steering system 28, a steering angle sensor 30, a brake system 32, a drive system 34, an accelerator sensor 36, a shift sensor 38, wheel speed sensors 40, etc. are electrically connected via the in-vehicle network 26. The ECU 24 can control the steering system 28, the brake system 32, the drive system 34, etc. by sending control signals through the in-vehicle network 26. The ECU 24 can receive, via the in-vehicle network 26, the results of detection of a torque sensor 28a, a brake sensor 32a, the steering angle sensor 30, the accelerator sensor 36, the shift sensor 38, the wheel speed sensors 40, etc., an operation signal etc. from the operation input part 20 etc.

The ECU 24 includes, for example, a central processing unit (CPU) 24a, read-only memory (ROM) 24b, random-access memory (RAM) 24c, a display control unit 24d, an audio control unit 24e, a solid-state drive (SSD, flash memory) 24f, etc. The CPU 24a can perform, for example, various types of arithmetic processing and control such as image processing related to an image to be displayed on the display device 16, in addition to the determination of a movement target position of the vehicle 10 when performing parking assistance, the estimation of the current position of the vehicle 10, the calculation of a movement distance, and the calculation of a target vehicle speed and a movement target position at each time.

The CPU 24a can read a program installed and stored in a nonvolatile storage device such as the ROM 24b and perform arithmetic processing according to the program. The ROM 24b stores programs, parameters necessary for executing the programs, etc. The RAM 24c temporarily stores various data used in calculation in the CPU 24a. The display control unit 24d mainly performs, of the arithmetic processing in the ECU 24, image processing using image data obtained by the imaging units 14, the composition of image data to be displayed on the display device 16, etc.

The audio control unit 24e mainly performs, of the arithmetic processing in the ECU 24, the processing of audio data to be output by the audio output device 18. The SSD 24f is a rewritable nonvolatile storage unit, and can store data even when power to the ECU 24 is turned off. The CPU 24a, the ROM 24b, the RAM 24c, etc. can be integrated in the same package. The ECU 24 may be configured to use another logical operation processor such as a digital signal processor (DSP), a logic circuit, or the like, instead of the CPU 24a. A hard disk drive (HDD) may be provided instead of the SSD 24f. The SSD 24f or the HDD may be provided separately from the ECU 24.

As illustrated in FIG. 1, the vehicle 10 is, for example, a four-wheeled automobile, and includes the two left and right front wheels 12F and the two left and right rear wheels 12R. All of the four wheels 12 can be configured to be steerable. As illustrated in FIG. 2, the steering system 28 steers at least two of the wheels 12 of the vehicle 10. The steering system 28 includes the torque sensor 28a and an actuator 28b. The steering system 28 is electrically controlled by the ECU 24 or the like to operate the actuator 28b. The steering system 28 is, for example, an electric power steering system, a steer-by-wire (SBW) system, or the like.

The steering system 28 adds torque, that is, assist torque to a steering part (e.g., a steering wheel) by the actuator 28b to supplement steering force, or steers the wheels 12 by the actuator 28b. In this case, the actuator 28b may steer one of the wheels 12 or may steer two or more of the wheels 12. The torque sensor 28a detects, for example, torque applied to the steering part by the driver.

The steering angle sensor 30 is, for example, a sensor that detects the amount of steering of the steering part. The steering angle sensor 30 is configured using, for example, a Hall element or the like. The ECU 24 acquires the amount of steering of the steering part by the driver, the amount of steering of each wheel 12 at the time of automatic steering, etc. from the steering angle sensor 30, to perform various types of control. The steering angle sensor 30 detects the rotation angle of a rotating portion included in the steering part.

The brake system 32 is, for example, an anti-lock brake system (ABS) that prevents brake locking, electronic stability control (ESC) that prevents the vehicle 10 from skidding at the time of cornering, an electric brake system that enhances braking force (performs brake assist), brake-by-wire (BBW), or the like. The brake system 32 applies braking force to the wheels 12 and thus to the vehicle 10 via an actuator 32*b*. The brake system 32 can perform various types of control by detecting a sign of brake locking, spinning of the wheels 12, skidding, etc. from the rotation difference between the left and right wheels 12 or the like. The brake sensor 32*a* is, for example, a sensor that detects the position of a movable portion of a braking operation part (e.g., a brake pedal).

The drive system 34 is an internal combustion engine (engine) system or a motor system as a drive source. The drive system 34 controls the fuel injection amount and air-intake amount of the engine or controls the output value of the motor, according to the requested amount of operation (e.g. the amount of depression of the accelerator pedal) by the driver (user) detected by the accelerator sensor 36. Regardless of the user's operation, the drive system 34 can control the output value of the engine or the motor in cooperation with the control of the steering system 28 and the brake system 32, according to the travel conditions of the vehicle 10. The same applies to a case where the vehicle 10 is traveling in an automatic travel mode.

The accelerator sensor 36 is, for example, a sensor that detects the position of a movable portion of an acceleration operation part (e.g., an accelerator pedal). The accelerator sensor 36 can detect the position of the accelerator pedal as the movable portion.

The shift sensor 38 is, for example, a sensor that detects the position of a movable portion of a shift operation part (e.g., a shift lever). The shift sensor 38 can detect the position of a lever, an arm, a button, or the like as the movable portion. The shift sensor 38 may include a displacement sensor, or may be configured as a switch. The ECU 24 can determine whether the vehicle 10 receives a forward travel request or a backward travel request, based on the result of detection of the shift sensor 38.

The wheel speed sensors 40 are sensors that are provided to the respective wheels 12 to detect the amount of rotation and the number of revolutions per unit time of the respective wheels 12, and output the number of wheel speed pulses indicating the detected number of revolutions as a detected value. The wheel speed sensors 40 can be configured using, for example, Hall elements or the like. The ECU 24 calculates the vehicle speed, the amount of movement, etc. of the vehicle 10, based on the detected values acquired from the wheel speed sensors 40, to perform various types of control. When calculating the vehicle speed of the vehicle 10 based on the detected values from the wheel speed sensors 40 of the respective wheels 12, the ECU 24 determines the vehicle speed of the vehicle 10 based on the speed of the wheel 12 having the smallest detected value among the four wheels, to perform various types of control.

When one of the four wheels 12 has a larger detected value than the other wheels 12, for example, when one of the wheels 12 has a number of revolutions per unit period (unit time or unit distance) larger than those of the other wheels 12 by a predetermined number or more, the ECU 24 considers that that wheel 12 is in a slipping state (spinning state), and performs various types of control. The wheel speed sensors 40 may be provided to the brake system 32. In that case, the ECU 24 acquires the results of detection of the wheel speed sensors 40 via the brake system 32.

Note that the configurations, dispositions, electrical connection forms, etc. of the various sensors and actuators described above are examples, and can be variously set (changed).

For example, the ECU 24 performs parking assistance processing, based on captured image data acquired from the imaging units 14, and transmits, to the monitor device 22, data on surrounding images and audio generated based on the captured image data.

Figure 3:
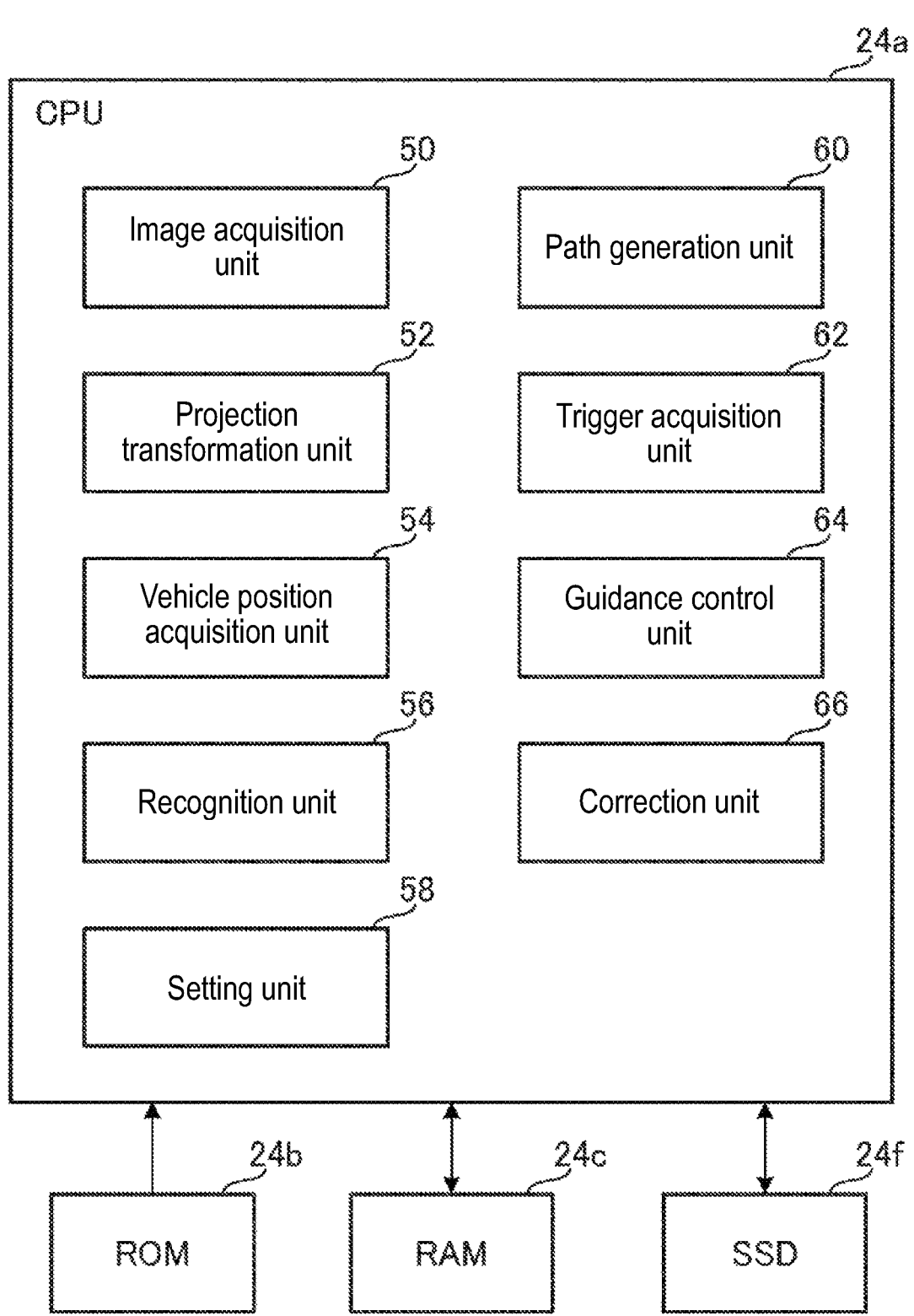
FIG. 3 is an exemplary block diagram of a functional configuration of a CPU and others of the parking assistance device of the embodiment.

The CPU 24*a* includes, for example, various modules as shown in FIG. 3 described later, and performs, for example, processing related to parking assistance. For example, the CPU 24*a* performs arithmetic processing, image processing, etc. on captured image data captured by the imaging units 14 to search for (present) a parking space candidate where the vehicle 10 can be parked, set a parking target position for guiding the vehicle 10 into a parking space, estimate the current position of the vehicle 10, and guide the vehicle 10 to the parking target position. Details of the CPU 24*a* will be described later.

In the present embodiment, the ECU 24 causes the vehicle 10 to be automatically or semi-automatically parked in a parking space by the cooperation of hardware and software (a control program), reducing a burden on the driver. As a parking assistance mode, there is "fully automatic parking assistance" in which the parking assistance system 100 performs a steering operation, an acceleration/deceleration operation, a braking operation, etc. for guiding the vehicle 10 to a movement target position set in a parking space, and the driver does not need to perform any operation other than an operation to start assistance. Other parking assistance modes are "semi-automatic parking assistance" in which at least one operation of fully automatic parking assistance is entrusted to the driver, "guidance assistance" in which details of operation of the vehicle 10 are provided to the driver by voice or display, and the driver drives the vehicle 10 according to the operation details, etc. In the following description, "fully automatic parking assistance" to cause the vehicle 10 to travel backward into a parking space will be described as an example.

Figure 4:
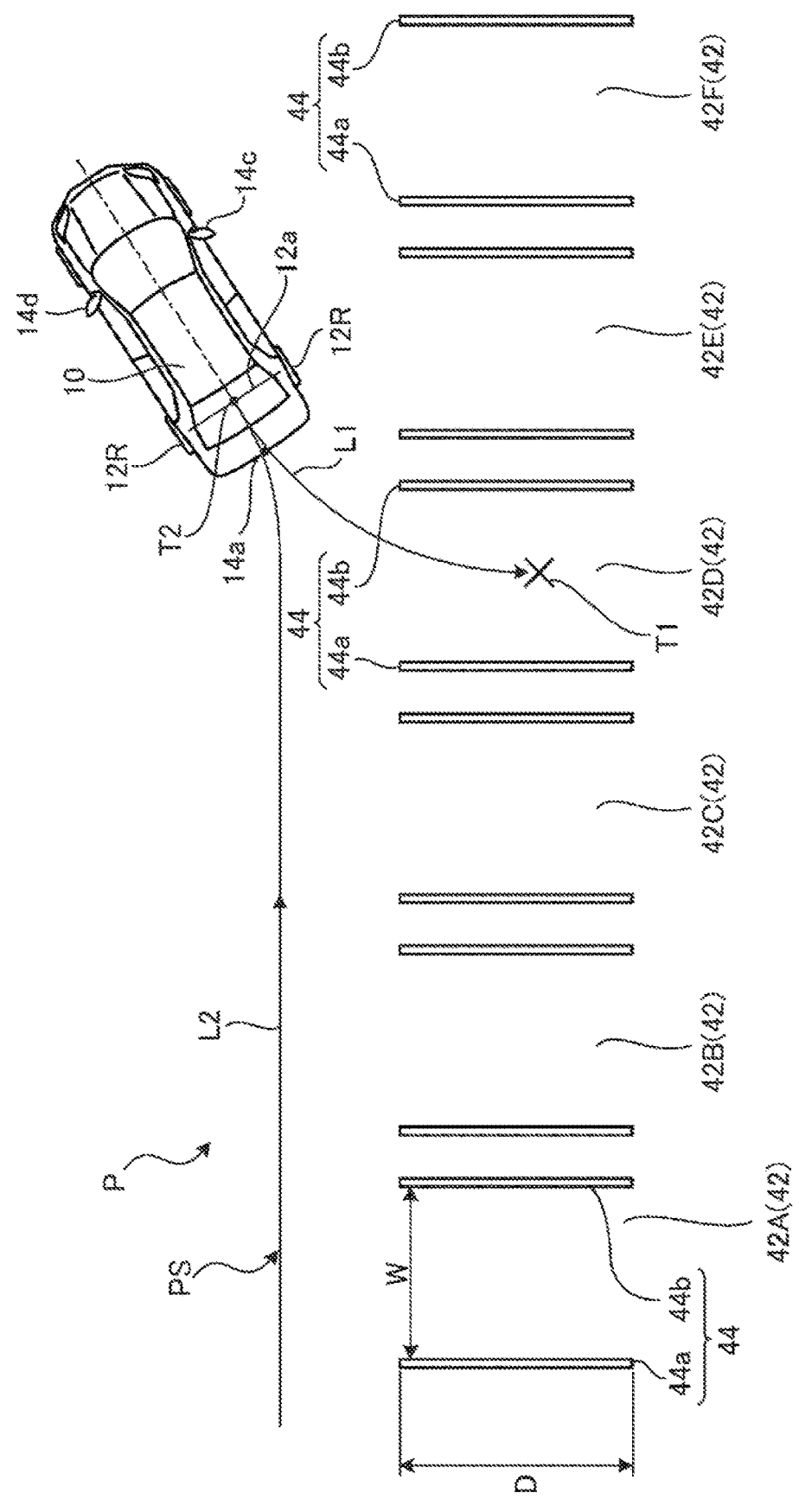
FIG. 4 is a diagram for describing an example of a case where vehicle parking assistance is performed by the parking assistance device of the embodiment.

First, an outline of parking assistance will be described with reference to FIG. 4. FIG. 4 is a diagram for describing an example of a case where the parking assistance system 100 (the parking assistance device) of the embodiment performs parking assistance for the vehicle 10, and is an overhead schematic diagram conceptually describing a search for a parking space 42 and the guidance of the vehicle 10 using a movement path L1. FIG. 4 is an example in which, for example, the vehicle 10 enters a parking lot P for parking in which a plurality of parking spaces 42 each defined by a pair of dividing lines 44*a* and 44*b* (hereinafter, referred to as dividing lines 44 when not distinguished) are aligned (for example, parking spaces 42A to 42F are aligned side by side).

The dividing lines 44*a* and 44*b* are, for example, white lines painted on the parking road surface, and are arranged to define the parking spaces 42 of sufficient width W and depth D to allow the parking of a common passenger vehicle (e.g., the vehicle 10). The parking assistance system 100 searches for a parking space 42 available for parking when the vehicle 10 travels at a parking space search speed or less (e.g. 30 km/h or less). In the case of FIG. 4, the parking assistance system 100 searches for a parking space 42 that can be present around the vehicle 10 (e.g. on the left or right) (FIG. 4 shows only the parking spaces 42 on one side) by the imaging units 14 mounted on the vehicle 10 while the vehicle 10 is traveling in a parking lot travel space PS along which the parking spaces 42 are aligned in the parking lot P (e.g., while the vehicle 10 is traveling in a travel path L2).

The parking assistance system 100 performs image processing such as edge processing on images captured during travel, successively, and performs, for example, straight line detection or the like to recognize the dividing lines 44 such as the dividing lines 44a and 44b or something similar to them. When a pair of dividing lines 44a and 44b adjacent to each other at a distance wider than the vehicle width of the vehicle 10 are recognized, a space defined by the pair of dividing lines 44a and 44b is recognized as a parking space 42. Furthermore, when an object such as another vehicle is not present in the recognized parking space 42, the parking assistance system 100 registers that parking space 42 as a parking space 42 candidate available for parking, and, for example, displays the candidate on the display device 16 to present it to the driver.

When the driver selects a parking space 42 in which the driver wants to park from presented parking space 42 candidates, the parking assistance system 100 sets a movement target position T1 for guiding the vehicle 10 into the selected parking space 42. The parking assistance system 100 sets the movement target position T1, based, for example, on the positions of front end portions of the dividing lines 44a and 44b constituting the selected parking space 42, the direction (angle) in which the dividing line 44a and the dividing line 44b extend that is obtained as a result of straight line detection, etc., in addition to the vehicle width, vehicle length, etc. of the vehicle 10.

For example, the movement target position T1 is set at a position where a reference position T2 set at the central position in the vehicle width direction of a rear wheel axle 12a that supports the rear wheels 12R of the vehicle 10 will be present when the vehicle 10 is put in the selected parking space 42. Consequently, the parking assistance system 100 can park the vehicle 10 in the selected parking space 42 by calculating the movement path L1 connecting the reference position T2 indicating the current position of the vehicle 10 and the movement target position T1, using a known technique, and guiding the vehicle 10 by backward travel along the movement path L1.

As described above, when dividing lines are recognized using a captured image, it is assumed that the position and angle of a camera are known. However, in practice, the position and angle of a camera change depending on the weight of passengers and goods, the tire pressure, etc., so that errors occur in the results of recognition of dividing lines using a captured image. The errors vary depending on the distance and direction from the vehicle to the dividing lines.

Figure 5:
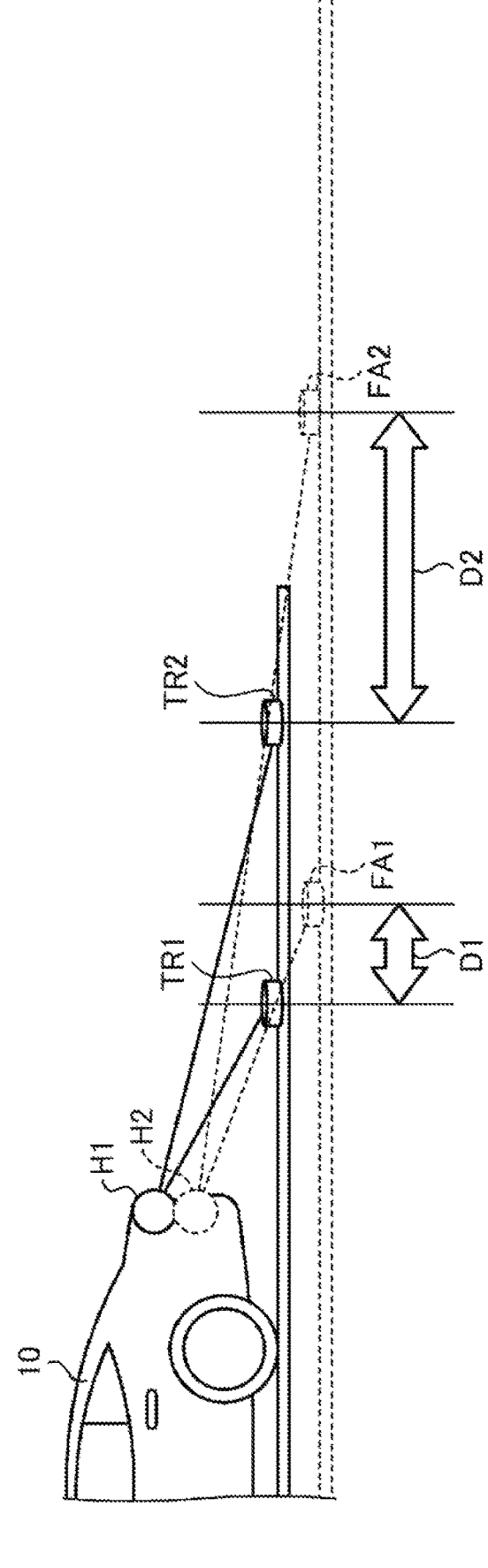
FIG. 5 is a diagram for explaining that the positions of objects recognized from a captured image vary depending on the height position of a camera.

Here, FIG. 5 is a diagram for explaining that the positions of objects recognized from a captured image vary depending on the height position of a camera. A camera position H1 is a height position set for the camera (a known height position). On the other hand, a camera position H2 is the actual height position of the camera when the vehicle body of the vehicle 10 has sunk due to the weight of passengers and goods, etc.

Recognized positions TR1 and TR2 are correct recognized positions obtained by image recognition of predetermined imaged objects (e.g. white lines). On the other hand, recognized positions FA1 and FA2 are recognized positions having errors obtained by image recognition of the predetermined imaged objects.

That is, the recognized position FA1 has an error by a distance D1 compared to the correct recognized position TR1. The recognized position FA2 has an error by a distance D2 compared to the correct recognized position TR2. Thus, an imaged object at a larger distance from the camera has a larger error. This example has described errors due to the height position of the camera. The same applies to errors due to the angle of the camera.

Errors in the results of recognition of dividing lines cause, for example, cutting of the wheel when the vehicle is guided to the movement target position, reducing the accuracy of vehicle guidance, which is not preferable. For example, adding a vehicle height sensor or the like can provide an improvement but has a problem of increased cost.

The following describes a technique that allows a vehicle to be guided to a parking space with high accuracy even when there are errors in the results of recognition of dividing lines using a captured image, without adding a physical configuration.

First, with reference to FIGS. 6 and 7, outlines of a conventional technique and the present embodiment will be described. FIGS. 6A-C are diagram for describing an example of the results of recognition of dividing lines when reverse perpendicular parking is performed using the conventional technique.

Figure 6A:
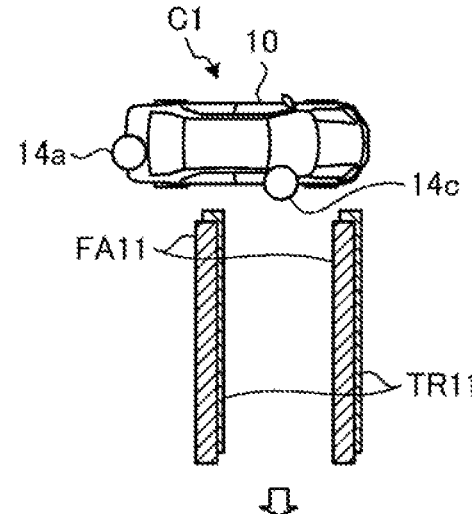
FIGS. 6A-C are diagram for describing an example of the results of recognition of dividing lines when reverse perpendicular parking is performed using a conventional technique.

As shown as a state C1 in FIG. 6A, parking assistance is started when the vehicle 10 is located beside dividing lines TR11 (actual dividing line positions). At this time, since the distance from the vehicle 10 to the dividing lines TR11 is short, dividing line recognition results FA11 are positions close to the dividing lines TR11. That is, errors are small.

Figure 6B:
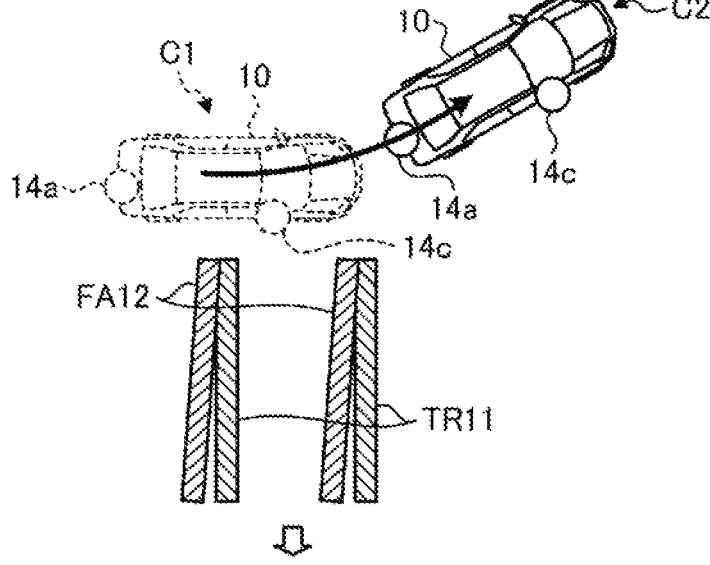

After the start of the parking assistance, as shown as a state C2 in FIG. 6B, the vehicle 10 temporarily moves away from the dividing lines TR11. At that time, since the distance from the vehicle 10 to the dividing lines TR11 is long, dividing line recognition results FA12 are positions away from the dividing lines TR11. That is, errors are large. For each of the two dividing lines TR11, the distance from the vehicle 10 to one end is different from that to the other end. Thus, the errors in the dividing line recognition results FA12 also develop in the extending direction, compared to the dividing lines TR11.

Figure 6C:
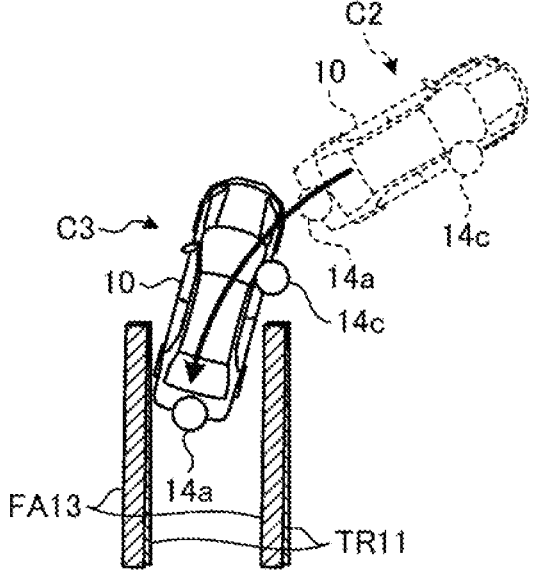

Then, as shown as a state C3 in FIG. 6C, the vehicle 10 gradually approaches the dividing lines TR11. At that time, since the distance from the vehicle 10 to the dividing lines TR11 decreases, dividing line recognition results FA13 gradually approach the dividing lines TR11. That is, the errors gradually decrease. In addition, the errors in the extending direction of the dividing line recognition results FA13 gradually decrease.

When dividing line recognition results are as described above, there arises a need to move the vehicle 10 further inward than in a planned turning path at the time of entering, and larger steering is required. However, there is a limit to the steering angle, and following may be difficult. In that case, there may arise a need to cut the wheel repeatedly. Even if following is possible, the behavior may cause the driver to feel uncomfortable.

Figure 7A:
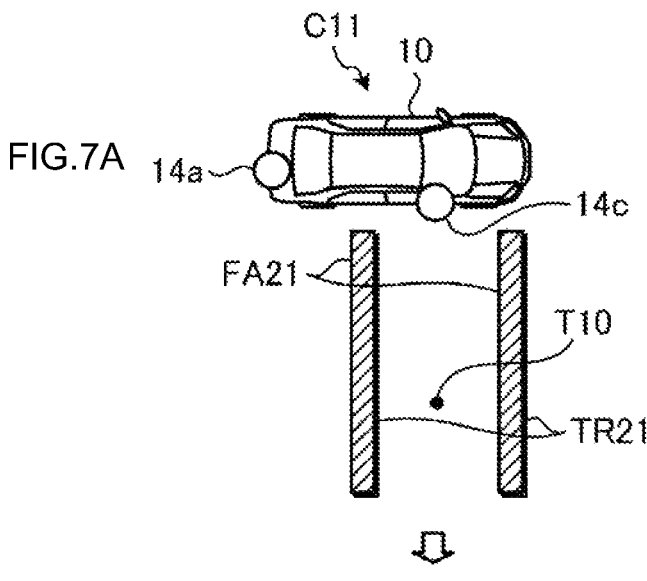
FIGS. 7A-C are diagram for describing an example of the results of recognition of dividing lines when reverse perpendicular parking is performed by the parking assistance device of the embodiment.
Figure 7B:
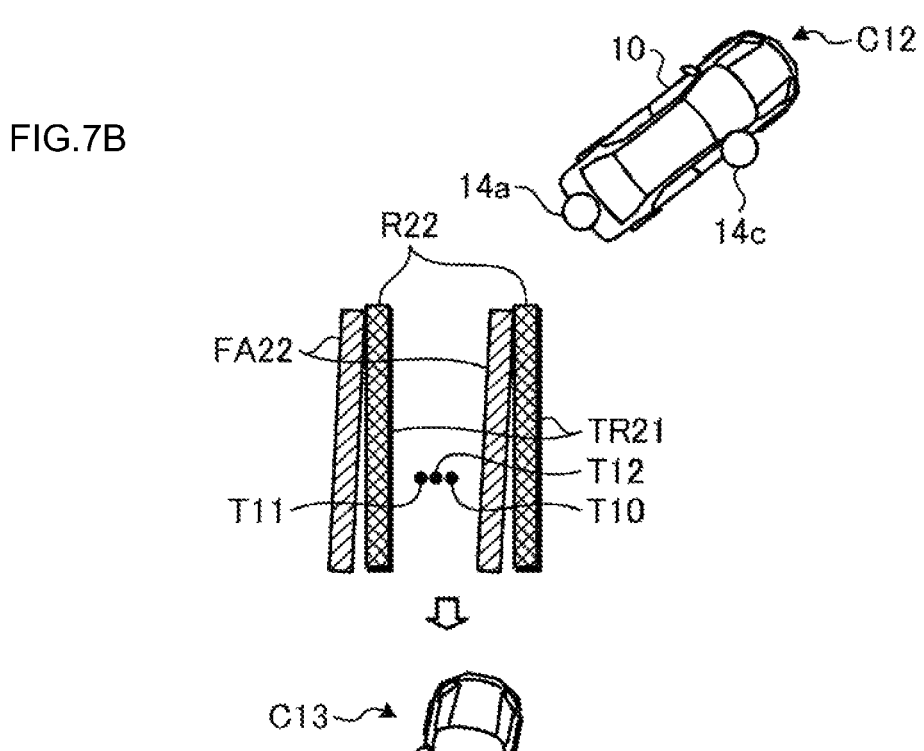
Figure 7C:
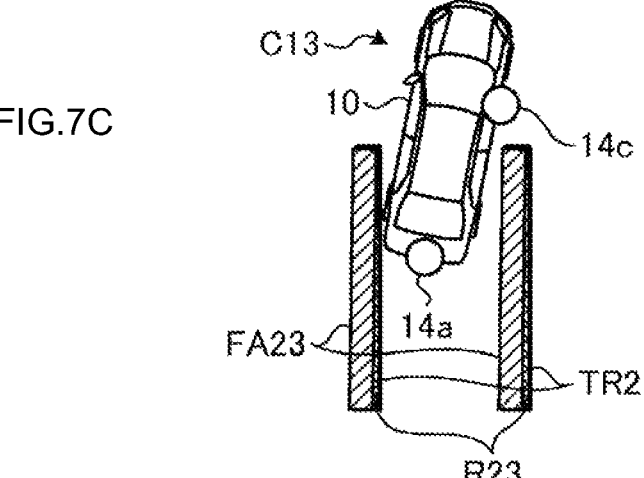

Next, FIGS. 7A-C are diagram for describing an example of the results of recognition of dividing lines when reverse perpendicular parking is performed by the parking assistance device of the embodiment.

First, as shown as a state C11 in FIG. 7A, parking assistance is started when the vehicle 10 is located beside dividing lines TR21 (actual dividing line positions). At this time, since the distance from the vehicle 10 to the dividing lines TR21 is short, dividing line recognition results FA21 are positions close to the dividing lines TR21. That is, errors are small. The dividing line recognition results FA21 at this time (or a reference movement target position T10 based thereon) are stored.

After the start of the parking assistance, as shown as a state C12 in FIG. 7B, the vehicle 10 temporarily moves away from the dividing lines TR21. At that time, since the distance from the vehicle 10 to the dividing lines TR21 is long, dividing line recognition results FA22 are positions away from the dividing lines TR21. That is, errors are large. For each of the two dividing lines TR21, the distance from the vehicle 10 to one end is different from that to the other end. Thus, the errors in the dividing line recognition results FA22 also develop in the extending direction, compared to the dividing lines TR21. Therefore, by correction, the dividing line recognition results FA22 (or a movement target position T11 based thereon) are corrected using the dividing line recognition results FA21 (or the reference movement target position T10 based thereon), to acquire corrected dividing lines R22 (or a movement target position T12 based thereon). Using the corrected dividing lines R22 (or the movement target position T12 based thereon), the parking assistance is performed.

Then, as shown as a state C13 in FIG. 7C, the vehicle 10 gradually approaches the dividing lines TR21. At that time, since the distance from the vehicle 10 to the dividing lines TR21 decreases, dividing line recognition results FA23 gradually approach the dividing lines TR21. That is, the errors gradually decrease. In addition, the errors in the extending direction of the dividing line recognition results FA23 gradually decrease. Here, as in the case of FIG. 7B, by correction, the dividing line recognition results FA23 are corrected using the dividing line recognition results FA21, to acquire corrected dividing lines R23. Using the corrected dividing lines R23, the parking assistance is performed.

In this way, even when errors in dividing line recognition results are large, highly accurate vehicle guidance can be achieved by correction using dividing line recognition results when errors are small. Details will be described below.

FIG. 3 is an exemplary block diagram of a functional configuration of the CPU 24a and others of the parking assistance device of the embodiment. The CPU 24a includes various modules for performing the parking assistance processing as described above. The various modules are implemented by the CPU 24a reading and executing a program installed and stored in a storage device such as the ROM 24b. For example, as shown in FIG. 3, the CPU 24a includes modules such as an image acquisition unit 50, a projection transformation unit 52, a vehicle position acquisition unit 54 (a position acquisition unit), a recognition unit 56, a setting unit 58, a path generation unit 60, a trigger acquisition unit 62, a guidance control unit 64, and a correction unit 66. Note that the modules shown in FIG. 3 are illustrated by function, and the modules may be changed as appropriate. If functions described below are integrated or separated, the same effects can be obtained.

The image acquisition unit 50 acquires captured images from the imaging units 14 that image the surrounding circumstances of the vehicle 10 via the display control unit 24d. In the case of the present embodiment, when a parking space 42 is searched for, side images of the vehicle 10 captured by the imaging units 14c and 14d are mainly acquired. When parking assistance is received at the time of entering by backward travel, rear images of the vehicle 10 captured by the imaging unit 14a are mainly acquired. When parking assistance is received at the time of entering by forward travel, front images of the vehicle 10 captured by the imaging unit 14b are mainly acquired. The image acquisition unit 50 provides acquired images to the projection transformation unit 52. When performing image processing such as distortion correction on images captured by the imaging units 14 for display, or when performing no image processing for display, or when superimposing another data for display, for example, the display control unit 24d may perform the processing and display the images on the display device 16.

The projection transformation unit 52 performs, for example, known projection transformation processing on images of the surroundings of the vehicle 10 acquired by the image acquisition unit 50, to transform the images into a three-dimensional image as shown in FIG. 4 in which the parking spaces 42 are viewed from above.

The vehicle position acquisition unit 54 acquires the current position of the vehicle 10. Specifically, the vehicle position acquisition unit 54 acquires the current position of the vehicle 10 (the vehicle position) in a coordinate system defined by a three-dimensional image transformed by the projection transformation unit 52. For example, as a vehicle design value of the vehicle 10, the relationship between the mounting position of the imaging unit 14a and the central position of the rear wheel axle 12a in the vehicle width direction is known. Consequently, when the projection transformation unit 52 performs projection transformation on an image captured by the imaging unit 14a, the position of the reference position T2 can be determined in three-dimensional coordinates. Likewise, the relationships between the mounting positions of the imaging unit 14c and the imaging unit 14d and the central position of the rear wheel axle 12a in the vehicle width direction are known. Consequently, the vehicle position acquisition unit 54 can successively acquire the current position of the vehicle 10 with respect to a reference point (e.g., the origin) defined in projection-transformed three-dimensional coordinates acquired at the time of searching for a parking space 42 or after the start of parking assistance.

The recognition unit 56 performs, for example, edge processing and straight line detection processing, etc. on a projection-transformed image to recognize dividing lines 44.

At the start of parking assistance, the setting unit 58 sets a reference movement target position (reference sign T10 in FIGS. 7A-C) of the vehicle in a parking space 42 defined by a pair of spaced dividing lines 44 included in a captured image. After the start of the parking assistance, the setting unit 58 sets the movement target position T1 (reference sign T11 in FIGS. 7A-C) of the vehicle in the parking space 42 defined by the pair of dividing lines 44 included in a captured image at predetermined control periods.

The movement target position T1 is a position to which the reference position T2 is guided when the vehicle 10 enters the parking space 42. The position of the movement target position T1 in the width direction of the parking space 42 is, for example, a midpoint position in the spaced direction between the pair of dividing lines 44a and 44b detected as straight lines. The position of the movement target position T1 in the depth direction of the parking space 42 can be, for example, a position corresponding to the distance from the front end of the vehicle 10 (the front bumper 10b) to the reference position T2 with respect to the entrance-side front end portions of the recognized dividing lines 44.

The path generation unit 60 calculates the movement path L1, using a known recommended movement path calculation technique, based on the set movement target position T1 and the reference position T2 of the vehicle 10 at the current position. When the movement target position T1 has been corrected by the correction unit 66, the path generation unit 60 calculates the movement path L1, based on the corrected movement target position T1 and the reference position T2 of the vehicle 10 at the current position.

The trigger acquisition unit 62 acquires a trigger signal for starting the parking assistance processing in the parking assistance system 100. For example, in the case of causing the vehicle 10 to travel backward to be parked, as parking assistance preparation processing, a search for a parking space 42 candidate, the selection of a parking space 42 in which the driver wants to park, the setting of the movement target position T1 (e.g., initial setting), the detection of the reference position T2 (e.g., initial estimation), etc. are performed.

To actually start parking assistance, the driver moves the shift operation part (e.g., the shift lever) to the "R position". In the case of the parking assistance system 100, for example, a movement of the shift operation part to the "R position" based on the result of detection of the shift sensor 38 is used as a trigger to start parking assistance. Note that parking assistance may be started by input using the operation input part 20 or input by voice, and the trigger acquisition unit 62 may acquire those input signals. That is, for example, when the trigger acquisition unit 62 acquires a trigger signal, based on at least one of the fact that the shift operation part has been in a predetermined position, and the fact that a parking assistance start operation has been performed by the user, the setting unit 58 and others recognize a parking assistance start.

The correction unit 66 corrects the movement target position T1, based on the reference movement target position. For example, the correction unit 66 corrects the movement target position T1 to the reference movement target position itself. Alternatively, for example, the correction unit 66 corrects the movement target position T1 to bring it closer to the reference movement target position.

Figure 8:
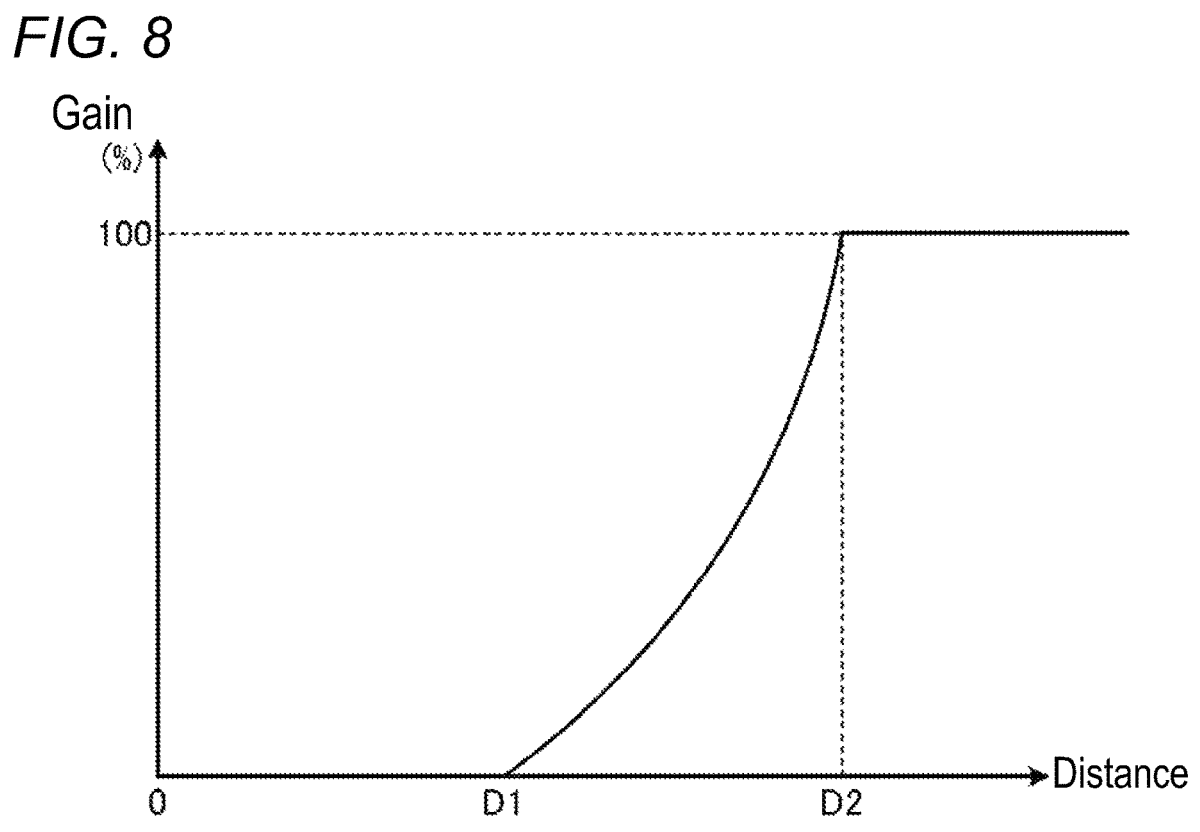

The shorter the distance from the vehicle 10 to the movement target position T1, the smaller the correction unit 66 may make the amount of correction by which to correct the movement target position T1. Here, FIG. 8 is a graph showing the relationship between distance and gain used in the parking assistance device of the embodiment.

The distance is a distance from the vehicle 10 to a dividing line. The gain is a number (0 to 1 (0 to 100%)) by which the difference between the movement target position T1 and the reference movement target position is multiplied. In the graph of FIG. 8, when viewed from the smallest distance, the gain increases from a distance D1, the gain becomes 100% at a distance D2, and the gain is 100% at the distance D2 or more.

Then, a value obtained by multiplying the difference between the movement target position T1 and the reference movement target position by the corresponding gain is added to the movement target position T1 to correct the movement target position T1. This ensures that the amount of correction is set to zero before the vehicle 10 reaches the movement target position T1, allowing the behavior of the vehicle 10 during parking assistance to be stabilized.

Returning to FIG. 3, when correcting the movement target position T1, the correction unit 66 may perform correction by an amount of correction equal to or less than a predetermined correction amount upper limit.

When the vehicle 10 moves in a turning path in a direction to approach the movement target position T1 during parking assistance, the correction unit 66 may perform correction to bring the movement target position T1 closer to the reference movement target position when the movement target position T1 is farther from the turning center of the turning path (the center of a circle when the turning path is approximated as a part of the circle) than the reference movement target position, and may not correct the movement target position when the movement target position T1 is closer to the turning center of the turning path than the reference movement target position.

When the amount of correction by which to correct the movement target position T1 increases over time as a result of calculation, the correction unit 66 may maintain the amount of correction without increasing it.

Figure 9B:
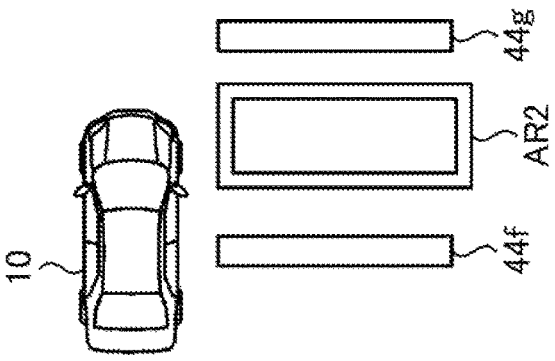
FIGS. 9A-B are diagram for describing an example of a case where a new dividing line is recognized in the parking assistance device of the embodiment.
Figure 9B:
Figure 9B:
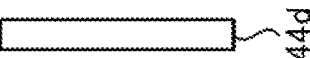
Figure 9B:

When the correction unit 66 has recognized a new dividing line in a captured image, the correction unit 66 may reset the amount of correction by which to correct the movement target position T1. Here, FIGS. 9A-B is a diagram for describing an example of a case where a new dividing line is recognized in the parking assistance device of the embodiment.

Figure 9A:
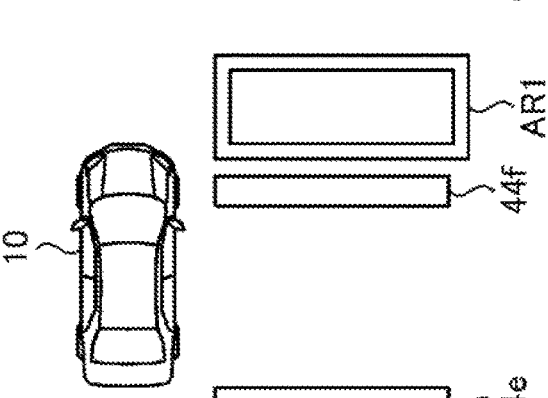
Figure 9A:

In FIG. 9A, the correction unit 66 recognizes dividing lines 44d to 44f in an image, but does not recognize a dividing line 44g in the image. In that case, the parking space is a space AR1 close to the dividing line 44f. After that, as shown in FIG. 9B, it is assumed that the correction unit 66 recognizes the dividing line 44g in an image. In that case, the parking space is changed to a middle space AR2 between the dividing line 44f and the dividing line 44g. Thus, when a new dividing line has been recognized in an image, the movement target position T1 (parking space) changes. Therefore, it is preferable to reset the amount of correction by which to correct the movement target position T1.

Returning to FIG. 3, for example, when the angle formed by the direction in which the vehicle 10 moves and the direction in which the pair of dividing lines 44 extend is a predetermined angle or more, the correction unit 66 performs the correction of the movement target position T1. In that case, when the angle formed by the direction in which the vehicle 10 moves and the direction in which the pair of dividing lines 44 extend becomes equal to or less than the predetermined angle, the correction unit 66 finishes the correction of the movement target position T1.

The guidance control unit 64 performs control to guide the vehicle 10 to the movement target position T1, based on the movement target position T1 and the current position of the vehicle 10. When the movement target position T1 has been corrected, the guidance control unit 64 performs control to guide the vehicle 10 to the corrected movement target position T1, based on the corrected movement target position T1 and the current position of the vehicle 10.

The guidance control unit 64 performs guidance processing to move the vehicle 10 along the movement path L1 generated by the path generation unit 60 based on the corrected movement target position T1. When "fully automatic parking assistance" is performed, the guidance control unit 64 controls the steering system 28, the brake system 32, the drive system 34, etc. to cause the vehicle 10 to travel backward along the movement path L1 to bring the reference position T2 closer to the movement target position T1. In the case of "semi-automatic parking assistance" or "guidance assistance", operation details are provided to the driver by voice or display, and the driver performs part or all of operation to perform parking operation.

Figure 10:
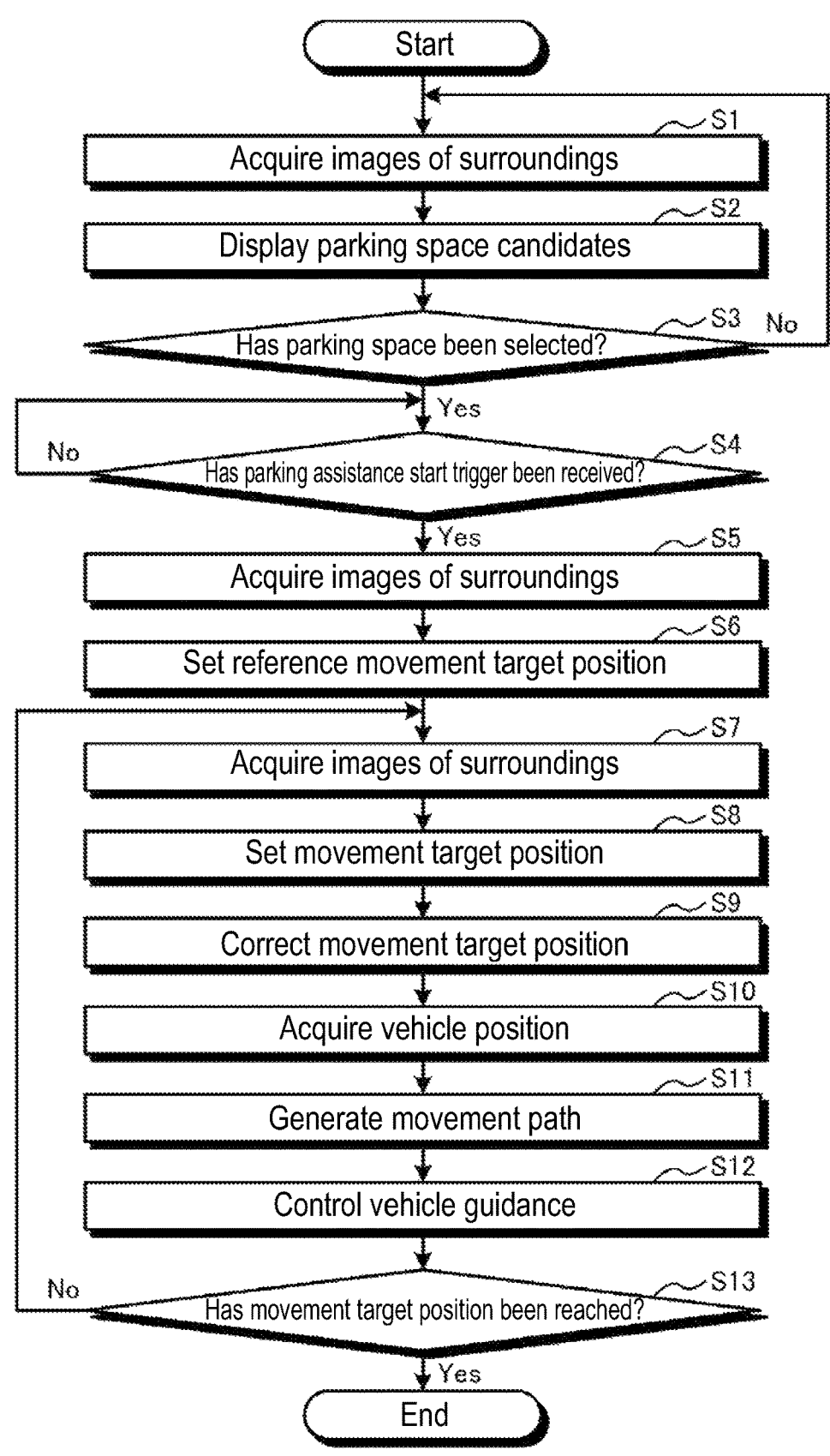
FIG. 10 is a flowchart showing an example of parking assistance processing by the parking assistance device of the embodiment.

Next, with reference to FIG. 10, an example of the parking assistance processing by the parking assistance device of the embodiment will be described. FIG. 10 is a flowchart showing an example of the parking assistance processing by the parking assistance device of the embodiment.

First, the imaging units 14 of the vehicle 10 normally capture images of the surroundings of the vehicle 10 at all times. When the vehicle 10 is traveling at, for example, 30 km/h or less (the parking space search speed or less), the parking assistance system 100 considers that the driver is driving while looking for a space available for parking. Then, in step S1, the image acquisition unit 50 acquires images of the surroundings of the vehicle 10 from the imaging units 14 to search for a parking space 42 as a preparation stage for parking assistance.

Next, the projection transformation unit 52 performs projection transformation processing on the images captured during travel, successively, and the recognition unit 56 performs edge processing, straight line detection processing, obstacle detection processing, etc. on the projection-transformed images, searches for parking space 42 candidates, and displays the search results on the display device 16 (step S2).

Next, when no particular parking space 42 is selected by the driver or the setting unit 58 from the displayed parking space 42 candidates (No in step S3), the process returns to step S1, and the display of parking space 42 candidates based on newly acquired images is repeated.

On the other hand, when a parking space 42 is selected by the driver or the setting unit 58 (Yes in step S3), the process proceeds to step S4.

In step S4, the trigger acquisition unit 62 determines whether or not a trigger signal for starting the parking assistance processing has been received (acquired). If the determination is Yes, the process proceeds to step S5. If the determination is No, the process returns to step S4.

In step S5, the image acquisition unit 50 acquires images of the surroundings of the vehicle 10 from the imaging units 14.

Next, in step S6, the setting unit 58 sets a vehicle reference movement target position in the parking space 42 defined by a pair of dividing lines 44 included in a captured image.

Next, in step S7, the image acquisition unit 50 acquires images of the surroundings of the vehicle 10 from the imaging units 14.

Next, in step S8, the setting unit 58 sets a vehicle movement target position in the parking space 42 defined by the pair of dividing lines 44 included in a captured image.

Next, in step S9, the correction unit 66 corrects the movement target position T1, based on the reference movement target position. When the distance from the vehicle 10 to the movement target position becomes a predetermined distance (e.g. about three meters) or less, the correction may not be performed.

Next, in step S10, the vehicle position acquisition unit 54 acquires the current position of the vehicle 10 (the vehicle position).

Next, in step S11, the path generation unit 60 generates a movement path using a known recommended movement path calculation technique, based on the corrected movement target position T1 and the current position of the vehicle 10.

Next, in step S12, the guidance control unit 64 performs control to guide the vehicle 10 to the corrected movement target position T1, based on the current position of the vehicle 10 and the movement path.

Next, the guidance control unit 64 determines whether or not the vehicle 10 has reached the movement target position. If the determination is Yes, the process is completed. If the determination is No, the process returns to step S7.

As described above, the parking assistance system 100 of the present embodiment corrects a movement target position after the start of parking assistance, using a reference movement target position set at the start of the parking assistance, and thus can guide the vehicle 10 into a parking space with high accuracy even when there are errors in the results of recognition of dividing lines using a captured image, without adding a physical configuration. This can reduce the number of times of cutting of the wheel during, for example, parking assistance.

The shorter the distance from the vehicle 10 to the movement target position, the smaller the amount of correction by which to correct the movement target position may be made. This can avoid a situation in which the movement target position is corrected too much by a factor other than changes in the positions and angles of the cameras (imaging units 14) (such as a slope or a step on a road).

When the movement target position is corrected, it may be corrected by an amount of correction equal to or less than the predetermined correction amount upper limit. This can avoid a situation in which the movement target position is corrected too much by a factor other than changes in the positions and angles of the cameras.

When the vehicle 10 moves in a turning path in a direction to approach the movement target position during parking assistance, the correction unit 66 may perform correction to bring the movement target position closer to the reference movement target position when the movement target position is farther from the turning center of the turning path than the reference movement target position, and may not correct the movement target position when the movement target position is closer to the turning center of the turning path than the reference movement target position. Thus, when the movement target position is closer to the turning center of the turning path than the reference movement target position, in which the need for correction is low, the movement target position is not corrected. This can avoid destabilization of vehicle guidance that may occur when the movement target position is corrected.

When the amount of correction by which to correct the movement target position increases over time as a result of calculation, the amount of correction may be maintained without being increased. This can avoid a situation in which the vehicle swings in the side-to-side directions during guidance.

when a new dividing line has been recognized in a captured image, the amount of correction by which to correct the movement target position may be reset. This can achieve an appropriate response of resetting the amount of correction when a new dividing line has been recognized.

When the angle formed by the direction in which the vehicle 10 moves and the direction in which a pair of dividing lines 44 extend becomes equal to or less than the predetermined angle, the correction of the movement target position may be finished. This can achieve an appropriate response of finishing the correction in response to the fact that the angle becomes equal to or less than the predetermined angle, that is, the fact that the possibility of occurrence of cutting of the wheel during vehicle guidance has disappeared.

The start of parking assistance may be recognized, based on at least one of the fact that the shift operation part has been in the predetermined position, and the fact that the parking assistance start operation has been performed by the user. This allows the start of parking assistance to be recognized by a specific trigger such as the fact that the shift operation part has been in the predetermined position or the fact that the parking assistance start operation has been performed by the user.

When the movement target position is corrected based on the reference movement target position, the movement target position may be corrected to the reference movement target position itself, or the movement target position may be corrected to be closer to the reference movement target position. This allows more specific correction such as correcting the movement target position to the reference movement target position itself or bringing the movement target position closer to the reference movement target position.

The above-described embodiment has described the example in which the dividing lines 44 are painted on the parking road surface, but is not limited thereto, and can use any dividing lines that can be recognized by performing image processing on captured images. For example, the present embodiment is also applicable to a case where dividing lines are formed by ropes or the like, and can provide the same effects.

The program for the parking assistance processing performed by the CPU 24a of the present embodiment may be configured to be recorded in an installable-format or executable-format file on a computer-readable recording medium such as a CD-ROM, a flexible disk (FD), a CD-R, or a digital versatile disk (DVD), to be provided.

Furthermore, the parking assistance processing program may be configured to be stored on a computer connected to a network such as the Internet, and downloaded via the network to be provided. The parking assistance processing program executed in the present embodiment may be configured to be provided or distributed via a network such as the Internet.

Although the embodiment and modifications of the present disclosure have been described, the embodiment and modifications are presented as examples, and are not intended to limit the scope of the invention. The novel embodiment can be implemented in various other forms, and various omissions, substitutions, and changes can be made without departing from the gist of the disclosure. The embodiment and modifications thereof are included in the scope and gist of the disclosure, and are included in the invention described in the claims and the scope of its equivalents. For example, the above-described embodiment has described the case of reverse perpendicular parking, but is not limited thereto. Likewise, the present disclosure can also be applied to forward perpendicular parking, parallel parking, etc.

REFERENCE SIGNS LIST

10: Vehicle, 12a: Rear wheel axle, 14, 14a, 14b, 14c, 14d: Imaging unit, 16: Display device, 24: ECU, 24a: CPU, 42: Parking space, 44, 44a, 44b: Dividing line, 44c: Front end portion, 50: Image acquisition unit, 52: Projection transformation unit, 54: Vehicle position acquisition unit, 56: Recognition unit, 58: Setting unit, 60: Path generation unit, 62: Trigger acquisition unit, 64: Guidance control unit, 66: Correction unit, 100: Parking assistance system, L1: Movement path, L2: Travel path, T1, T11: Movement target position, T2: Reference position (vehicle position), T10: Reference movement target position, and T12: Corrected movement target position.

The invention claimed is:

1. A parking assistance device, comprising:
an image acquisition unit configured to acquire a captured image from an imaging unit configured to image surrounding circumstances of a vehicle;
a setting unit configured to set, at a start of parking assistance, a reference movement target position of the vehicle in a parking space defined by a pair of spaced dividing lines included in the captured image, and set, after the start of the parking assistance, a movement target position of the vehicle in the parking space defined by the pair of dividing lines included in the captured image, at predetermined control periods;
a correction unit configured to correct the movement target position, based on the reference movement target position;
a position acquisition unit configured to acquire a current position of the vehicle; and
a guidance control unit configured to perform control to guide the vehicle to the corrected movement target position, based on the corrected movement target position and the current position,
wherein the shorter a distance from the vehicle to the movement target position, the smaller the correction unit makes an amount of correction by which to correct the movement target position.

2. A parking assistance device, comprising:
an image acquisition unit configured to acquire a captured image from an imaging unit configured to image surrounding circumstances of a vehicle;
a setting unit configured to set, at a start of parking assistance, a reference movement target position of the vehicle in a parking space defined by a pair of spaced dividing lines included in the captured image, and set, after the start of the parking assistance, a movement target position of the vehicle in the parking space defined by the pair of dividing lines included in the captured image, at predetermined control periods;
a correction unit configured to correct the movement target position, based on the reference movement target position;
a position acquisition unit configured to acquire a current position of the vehicle; and
a guidance control unit configured to perform control to guide the vehicle to the corrected movement target position, based on the corrected movement target position and the current position, wherein
when the vehicle moves in a turning path in a direction to approach the movement target position during the parking assistance,
the correction unit performs correction to bring the movement target position closer to the reference movement target position when the movement target position is farther from a turning center of the turning path than the reference movement target position, and
the correction unit does not correct the movement target position when the movement target position is closer to the turning center of the turning path than the reference movement target position.

3. The parking assistance device according to claim 1, wherein when an amount of correction by which to correct the movement target position increases over time as a result of calculation, the correction unit maintains the amount of correction without increasing the amount of correction.

4. A parking assistance device, comprising:
an image acquisition unit configured to acquire a captured image from an imaging unit configured to image surrounding circumstances of a vehicle;
a setting unit configured to set, at a start of parking assistance, a reference movement target position of the vehicle in a parking space defined by a pair of spaced dividing lines included in the captured image, and set, after the start of the parking assistance, a movement target position of the vehicle in the parking space defined by the pair of dividing lines included in the captured image, at predetermined control periods;

a correction unit configured to correct the movement target position, based on the reference movement target position;

a position acquisition unit configured to acquire a current position of the vehicle; and a guidance control unit configured to perform control to guide the vehicle to the corrected movement target position, based on the corrected movement target position and the current position, wherein when the correction unit has recognized a new dividing line in the captured image, the correction unit resets an amount of correction by which to correct the movement target position.

5. The parking assistance device according to claim 1, wherein when an angle formed by a direction in which the vehicle moves and a direction in which the pair of dividing lines extend becomes equal to or less than a predetermined angle, the correction unit finishes correction of the movement target position.

6. The parking assistance device according to claim 1, wherein the setting unit recognizes the start of the parking assistance, based on at least one of a fact that a shift operation part has been in a predetermined position, and a fact that a parking assistance start operation has been performed by a user.

7. The parking assistance device according to claim 1, wherein when correcting the movement target position, based on the reference movement target position, the correction unit corrects the movement target position to the reference movement target position itself, or corrects the movement target position to bring the movement target position closer to the reference movement target position.

* * * * *